(12) United States Patent
Sako

(10) Patent No.: US 11,671,313 B2
(45) Date of Patent: Jun. 6, 2023

(54) PRINTING APPARATUS, PRINTING SYSTEM, METHOD OF REGISTERING PRINTING APPARATUS, AND MEDIUM

(71) Applicant: CANON KABUSHIKI KAISHA, Tokyo (JP)

(72) Inventor: Ritsuto Sako, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 87 days.

(21) Appl. No.: 16/877,623

(22) Filed: May 19, 2020

(65) Prior Publication Data

US 2020/0374187 A1   Nov. 26, 2020

(30) Foreign Application Priority Data

May 22, 2019 (JP) .............................. JP2019-096253

(51) Int. Cl.
*H04L 41/0806* (2022.01)
*H04L 41/0813* (2022.01)
*G06F 3/12* (2006.01)

(52) U.S. Cl.
CPC ........ *H04L 41/0806* (2013.01); *G06F 3/1292* (2013.01); *H04L 41/0813* (2013.01)

(58) Field of Classification Search
CPC ............. H04L 41/0806; H04L 41/0813; G06F 3/1292

See application file for complete search history.

(56) References Cited

U.S. PATENT DOCUMENTS

| 8,711,414 B2 | 4/2014 | Kashioka |
| 9,524,133 B2 | 12/2016 | Takano |
| 10,296,266 B2 | 5/2019 | Sako |
| 10,656,892 B2 | 5/2020 | Hirata et al. |
| 2006/0221368 A1* | 10/2006 | Higuchi ............... G06F 3/1204 358/1.13 |
| 2009/0070687 A1* | 3/2009 | Mazzaferri ............ G06F 9/542 715/751 |

(Continued)

FOREIGN PATENT DOCUMENTS

| JP | 2012-178031 A | 9/2012 |
| JP | 2013-513139 A | 4/2013 |

(Continued)

*Primary Examiner* — John A Follansbee
*Assistant Examiner* — Raqiul A Choudhury
(74) *Attorney, Agent, or Firm* — Venable LLP

(57) ABSTRACT

A printing apparatus provides information of a printer registration screen to receive an operation for registering the printing apparatus to a tenant, wherein the printer registration screen receives an operation for registering the printing apparatus to each of a plurality of tenants, and the information indicates the printing apparatus has been registered to each of the plurality of tenants, receives an instruction for registering the printing apparatus in response to an operation for registering the printing apparatus to the tenant via the printing registration screen, in association with a tenant that is managed in the first type cloud printing service, as a cloud printer that is used by a user belonging to the tenant, and requests, to the first type cloud printing service, to register the printing apparatus in association with the tenant based on an instruction received by the instruction unit.

12 Claims, 13 Drawing Sheets

(56) References Cited

U.S. PATENT DOCUMENTS

| | | | |
|---|---|---|---|
| 2011/0137805 A1 | 6/2011 | Brooksbank et al. | |
| 2012/0057193 A1* | 3/2012 | Jazayeri | G06F 3/1209 |
| | | | 358/1.15 |
| 2013/0163038 A1* | 6/2013 | Oishi | G06F 3/1288 |
| | | | 358/1.15 |
| 2015/0193175 A1* | 7/2015 | Mori | G06F 3/1228 |
| | | | 358/1.15 |
| 2015/0301773 A1* | 10/2015 | Minagawa | G06F 21/31 |
| | | | 358/1.13 |
| 2017/0163636 A1* | 6/2017 | Nishida | H04L 63/083 |
| 2018/0129454 A1* | 5/2018 | Sako | G06F 3/1204 |
| 2018/0285557 A1* | 10/2018 | Watanabe | G06F 21/45 |
| 2019/0288963 A1* | 9/2019 | Sugimoto | G06F 3/1236 |
| 2019/0294387 A1 | 9/2019 | Sako | |

FOREIGN PATENT DOCUMENTS

| | | |
|---|---|---|
| JP | 2014-206876 A | 10/2014 |
| JP | 2015-200943 A | 11/2015 |
| WO | 2011/067029 A1 | 6/2011 |

\* cited by examiner

F I G. 12
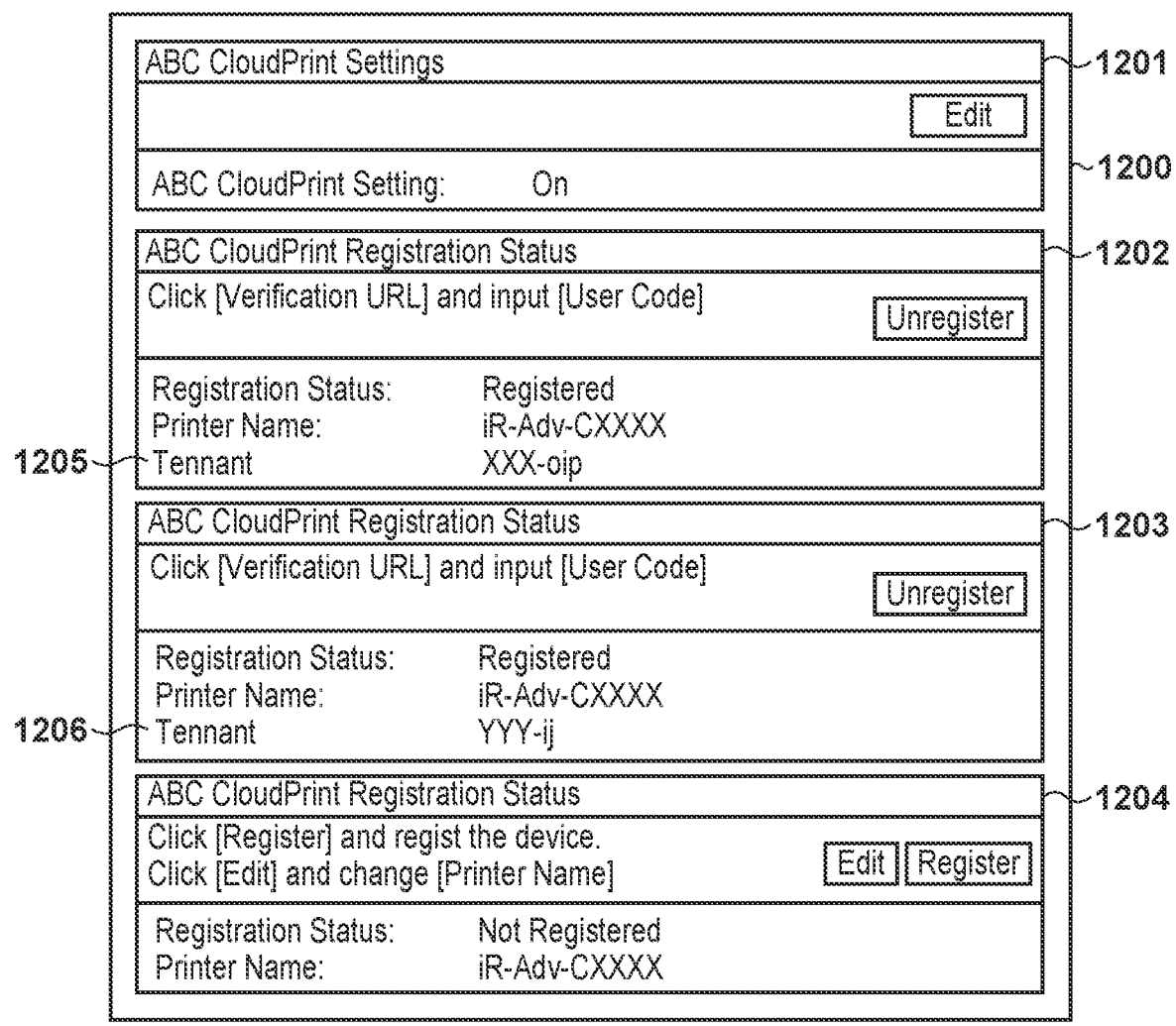

PRINTING APPARATUS, PRINTING SYSTEM, METHOD OF REGISTERING PRINTING APPARATUS, AND MEDIUM

BACKGROUND OF THE INVENTION

Field of the Invention

The present invention relates to a printing apparatus, a printing system, a method of registering printing apparatus, and a medium.

Description of the Related Art

It is hitherto known that a user performs printing by directly transmitting a print job from a client terminal such as a PC (Personal Computer) to a printing apparatus. Also, a cloud printing service is provided in which printing is executed using a cloud service provided on the Internet. In the hitherto known cloud printing service, a user first registers a printer in association with the account of the user.

Meanwhile, a multi-tenant SaaS (Software as a Service) configuration is known in which a plurality of clients use software resources on the cloud in a shared manner. In such a multi-tenant SaaS configuration, it is conceivable to provide a cloud printing function as a function to be provided to the clients. For example, a technique relating to a multi-tenant architecture is disclosed in Japanese Patent Laid-Open No. 2013-513139 as a mechanism for sharing computing resources and the like on the cloud between a plurality of clients.

Also, the number of cases where peripheral apparatuses such as printers are installed in spaces such as shared offices and coworking offices is increasing.

SUMMARY OF THE INVENTION

The present invention aims to provide a technique that enables users using different tenants to use one printer in a shared manner in a cloud printing service in a multi-tenant environment.

The invention of this application includes the following configurations.

According to an aspect of the present invention, there is provided a printing apparatus that can be used in a first type cloud printing service, comprising: at least one processor; and at least one memory storing a program, wherein the processor, by executing the program, functions as: an instruction unit configured to receive an instruction for registering the printing apparatus, in association with a tenant that is managed in the first type cloud printing service, as a cloud printer that is used by a user belonging to the tenant; and a requesting unit configured to request, to the first type cloud printing service, to register the printing apparatus in association with the tenant based on an instruction received by the instruction unit, and the instruction unit is configured to receive, even if the printing apparatus has already been registered as a cloud printer that is managed in the first type cloud printing service, an instruction for registering the printing apparatus as a different cloud printer that is managed in the first type cloud printing service.

According to another aspect of the present invention, there is provided a printing system comprising: a printing apparatus that can be used in a first type cloud printing service; and a server that provides the first type cloud printing service, wherein the printing apparatus includes: at least one processor; and at least one memory storing a program, and the processor, by executing the program, functions as: an instruction unit configured to receive an instruction for registering the printing apparatus, in association with a tenant that is managed in the first type cloud printing service, as a cloud printer that is used by a user belonging to the tenant; and a requesting unit configured to request, to the first type cloud printing service, to register the printing apparatus in association with the tenant based on an instruction received by the instruction unit, and the instruction unit is configured to receive, even if the printing apparatus has already been registered as a cloud printer that is managed in the first type cloud printing service, an instruction for registering the printing apparatus as a different cloud printer that is managed in the first type cloud printing service.

According to still another aspect of the present invention, there is provided a method of registering a printing apparatus that can be used in a first type cloud printing service, comprising: receiving an instruction for registering the printing apparatus, in association with a tenant that is managed in the first type cloud printing service, as a cloud printer that is used by a user belonging to the tenant; and requesting, to the first type cloud printing service, to register the printing apparatus in association with the tenant based on an instruction received in the receiving; and wherein, in the receiving of an instruction, even if the printing apparatus has already been registered as a cloud printer that is managed in the first type cloud printing service, an instruction can be received for registering the printing apparatus as a different cloud printer that is managed in the first type cloud printing service.

According to yet another aspect of the present invention, there is provided a non-transitory computer-readable storage medium storing a program that, when executed by a computer that controls a printing apparatus that can be used in a first type cloud printing service, causes the computer to execute: instructing for receiving an instruction for registering the printing apparatus, in association with a tenant that is managed in the first type cloud printing service, as a cloud printer that is used by a user belonging to the tenant; and requesting, to the first type cloud printing service, to register the printing apparatus in association with the tenant based on an instruction received in the instructing; and wherein, in the instructing, even if the printing apparatus has already been registered as a cloud printer that is managed in the first type cloud printing service, an instruction can be received for registering the printing apparatus as a different cloud printer that is managed in the first type cloud printing service.

According to the present invention, users using different tenants can use one printer in a shared manner in a cloud printing service in a multi-tenant environment.

Further features of the present invention will become apparent from the following description of exemplary embodiments with reference to the attached drawings.

BRIEF DESCRIPTION OF THE DRAWINGS

FIG. 12 is a diagram illustrating an exemplary configuration of a UI screen for registering a cloud printer according to a third embodiment.

DESCRIPTION OF THE EMBODIMENTS

Figure 1:
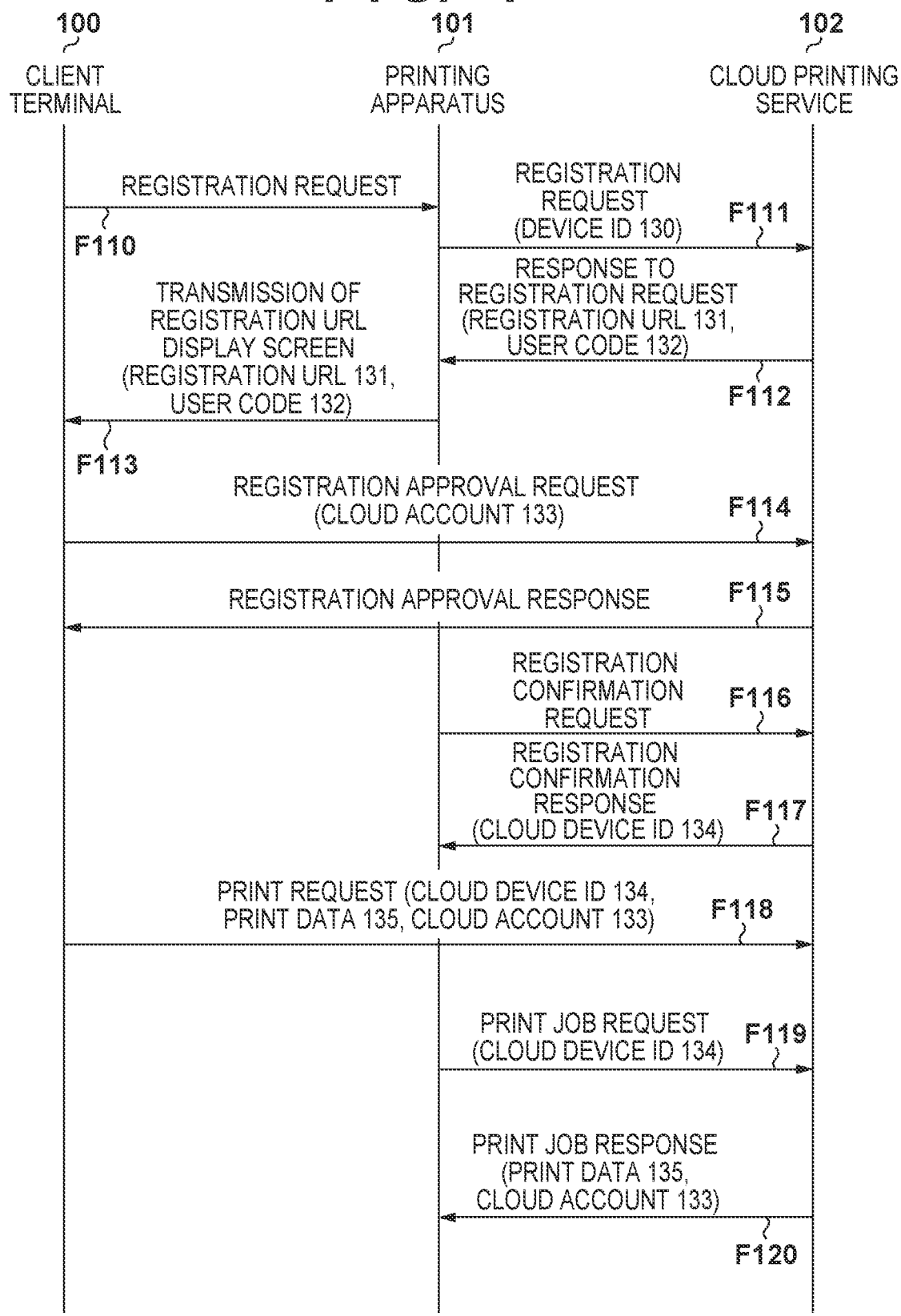
FIG. 1 is a diagram illustrating a processing sequence of cloud printing according to a present embodiment.

A printer installed in a space such as a shared office or a coworking space normally provides a printing function for a plurality of users that belong to a plurality of organizations (companies). Here, there are cases where the users belonging to different organizations use different tenants. Meanwhile, in a known printer compatible with cloud printing, the only case taken into consideration is one where the printer is registered as one cloud printer to one cloud printing service.

In the embodiments described below in detail, a mechanism will be described for controlling one printer so as to be also used by users that use different tenants in a shared manner, in a cloud printing service in a multi-tenant environment, such that the one printer can be shared by a plurality of users that respectively belong to a plurality of tenants as different cloud printers.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

Cloud Printing Processing

FIG. 1 is a diagram for illustrating an example of a processing sequence of cloud printing in a printing system according to a present embodiment. It is assumed that a client terminal 100, a printing apparatus 101, and a cloud printing service 102 perform processing in a cooperative manner in order to provide a cloud printing service according to the present embodiment. The printing apparatus 101 is assumed to support a cloud printing function and a Web UI (User Interface) function for operating the printing apparatus 101. The client terminal 100 is assumed to support a cloud printing client function and a Web UI client for operating a Web UI provided by the printing apparatus 101. The Web UI client may be realized by a Web browser (not illustrated) included in the client terminal 100, for example. The cloud printing service 102 represents a cloud printing service on the Internet. The cloud printing service 102 is not limited to a service that is realized by one server, and may be constituted by a plurality of servers corresponding to respective functions, or may be constituted by a plurality of apparatuses for distributed processing. Also, there is no specific limitation on the type of cloud service provided by the cloud printing service 102.

First, in F110, a user transmits a registration request to the printing apparatus 101 via the Web UI using the Web UI client of the client terminal 100.

In F111, the printing apparatus 101, upon receiving the registration request from the client terminal 100, transmits a registration request to the cloud printing service 102. Here, the registration request transmitted from the printing apparatus 101 includes a device ID 130 for the cloud printing service 102 to uniquely specify the printing apparatus 101. In the present embodiment, the device ID 130 is assumed to be created by the printing apparatus 101.

In F112, the cloud printing service 102, upon receiving the registration request from the printing apparatus 101, transmits a response to the registration request that includes a registration URL (Uniform Resource Locator) 131 and a user code 132 to the printing apparatus 101. The registration URL 131 indicates the address of a UI screen for registering a printing apparatus as a cloud printer, and an arbitrary value may be set therein. Also, the user code 132 is authentication information when registering the printing apparatus, and the creation method and the specification thereof are not specifically limited.

In F113, the printing apparatus 101, upon receiving the response to the registration request from the cloud printing service 102, transmits registration URL display screen information including the registration URL 131 and the user code 132 to the client terminal 100 via the Web UI. The client terminal 100, upon receiving the registration URL display screen information from the printing apparatus 101, displays the registration URL 131 and the user code 132 in the Web UI client based on the information.

In F114, the user operates the Web UI client in the client terminal 100, and makes an instruction for accessing the registration URL on a screen. With this, the client terminal 100 transmits a registration approval request including a cloud account 133 to the cloud printing service 102. The cloud account 133 is information associated with a user that uses the cloud service. Here, it is assumed that the cloud account 133 is input by the user when using the cloud service, or is retained in the client terminal 100.

In F115, the cloud printing service 102, upon receiving the registration approval request from the client terminal 100, transmits a registration approval response to the client terminal 100. Here, the registration approval response may include a message saying that the registration of the printing apparatus 101 has been accepted and the like.

In F116, the printing apparatus 101 transmits a registration confirmation request to the cloud printing service 102.

In F117, the cloud printing service 102, upon receiving the registration confirmation request from the printing apparatus 101, transmits a registration confirmation response including a cloud device ID 134 to the printing apparatus 101. The cloud device ID 134 is issued by the cloud printing service 102, and is identification information for uniquely identifying the printing apparatus 101. The printing apparatus 101 retains the cloud device ID 134 issued by the cloud printing service 102 in a storage unit or the like. At this stage, the printing apparatus 101 enters a state of grasping of being registered in the cloud printing service 102 as a cloud printer, and a state is entered in which the cloud printing service 102 can be used in the printing apparatus 101.

In F118, the client terminal 100 transmits a print request including the cloud device ID 134, print data 135, and the cloud account 133 to the cloud printing service 102 based on a user instruction. The cloud printing service 102, upon receiving the print request from the client terminal 100, retains and manages the information included therein.

In F119, the printing apparatus 101 transmits a print job request including the cloud device ID 134 to the cloud printing service 102. The cloud device ID 134 to be transmitted here has a value acquired in F117.

In F120, the cloud printing service 102 specifies a printing apparatus (printing apparatus 101, here) that is managed, based on the cloud device ID 134 indicated by the received print job request. Also, the cloud printing service 102 transmits the information of the print job that is managed in association with the printing apparatus, as the response to the print job request (print job response). The print job response here includes information regarding the print data 135 and the cloud account 133. Thereafter, the printing apparatus 101 performs print processing using the print data 135 received as the print job response. The processing described above is the series of flow from the registration of a printing apparatus to the execution of a print job, in a cloud printing using the cloud printing service 102.

Operation Screen

Figure 2:
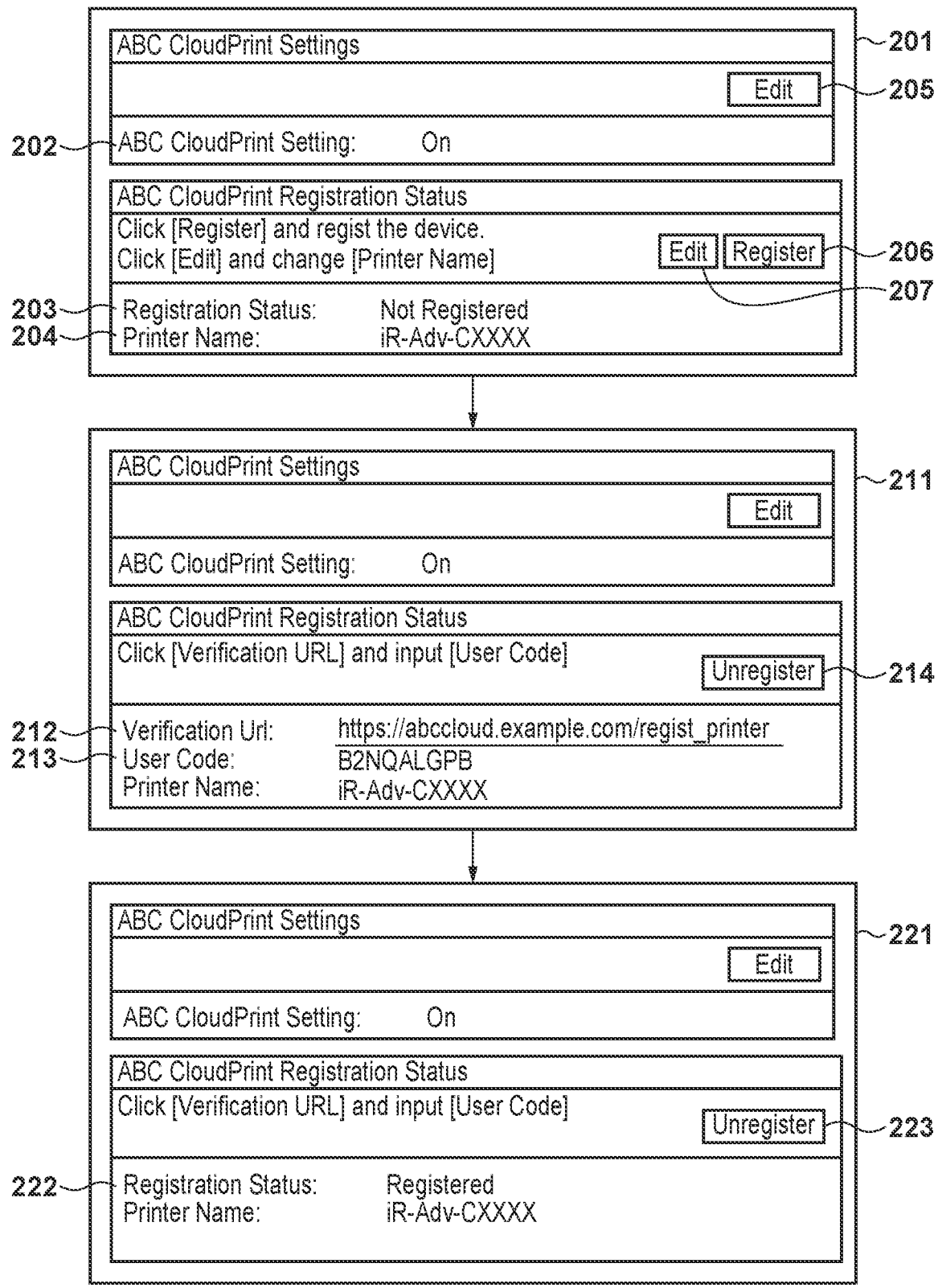
FIG. 2 is a diagram illustrating an exemplary configuration of a UI screen for registering a cloud printer according to the present embodiment.

FIG. 2 is a diagram illustrating an exemplary screen configuration for performing processing for registering the printing apparatus 101 to the cloud printing service 102 according to the present embodiment. This UI screen may be a UI displayed on a display panel included in the printing apparatus 101, or a Web UI for making an operation by accessing a Web server (not illustrated) that operates inside the printing apparatus 101 from the client terminal 100. It is assumed that the UI screen is the Web UI in the following description.

A screen 201 is a screen for setting and registering the cloud printing. Setting information 202 shows setting information indicating whether the cloud printing function is enabled or disabled. Upon an Edit button 205 being pressed, the screen is transitioned to a screen (not illustrated) for changing the setting as to whether the cloud printing function is enabled or disabled, and the setting can be changed. Registration information 203 indicates the registration status of the cloud printer. In the registration information 203, "Not Registered" is displayed when being in an unregistered state, and "Registered" is displayed when being in a registered state. Printer name information 204 indicates the printer name of the cloud printing. Upon an Edit button 207 being pressed, the screen is transitioned to a screen (not illustrated) for editing the printer name to be used as a display name or the like, and the printer name can be changed. An instruction to change the printer name can be received on this screen. Upon a Register button 206 being pressed, the printing apparatus 101 transmits a registration request to the cloud printing service 102 (F111 in FIG. 1), and receives a response to the registration request as the response thereto (F112 in FIG. 1).

Upon receiving the response to the registration request, the screen transitions from the screen 201 to a screen 211 (F113 in FIG. 1). The screen 211 is a screen for displaying the registration URL 131 and the user code 132 for registering the cloud printer. Registration URL information 212 shows the value of the registration URL 131. User code information 213 shows the value of the user code 132.

When a user accesses the registration URL 131 displayed in the registration URL information 212 on the screen 211, and inputs the user code 132, the registration of the printing apparatus 101 is completed. With this, the display screen transitions to a screen 221. On the other hand, if an Unregister button 214 is pressed on the screen 211, the processing for registering the printing apparatus 101 is interrupted.

In the screen 221, registration information 222 shows the registration status of the cloud printer. Here, the printing apparatus 101 has already been registered following the flow described above, and therefore "Registered" is displayed. Also, the Register button 206 for registering a cloud printer is displayed in the screen 201, but in the screen 221, since the cloud printer has already been registered, an Unregister button 223 is displayed. Upon the Unregister button 223 being pressed, the processing for canceling the registration of the registered printing apparatus 101 is performed. Although the detailed description of the processing for canceling the registration is omitted, but the registration is canceled by the printing apparatus 101 transmitting an instruction to cancel the registration to the cloud printing service 102 while designating the device ID 130 and the cloud device ID 134, for example.

Figure 3:
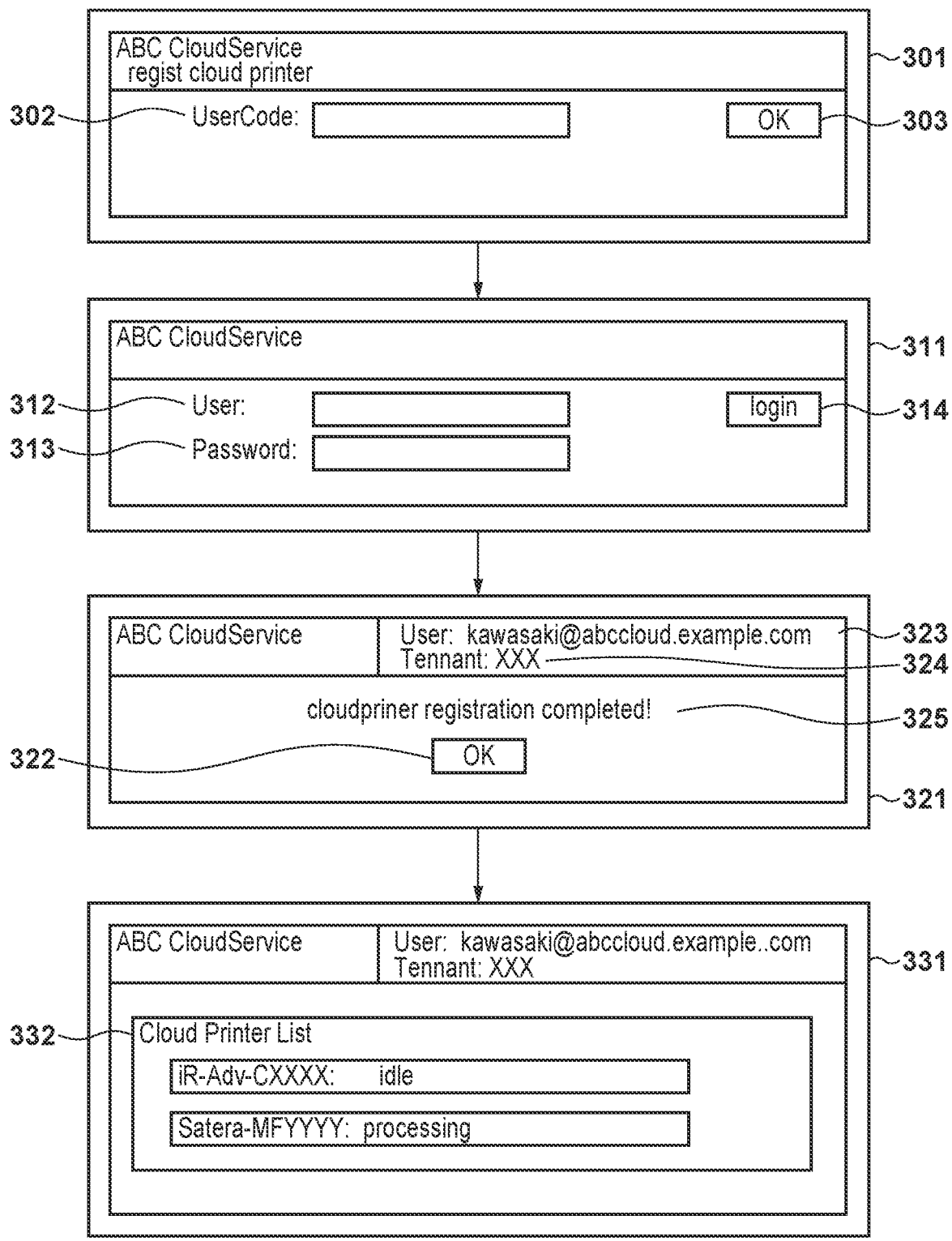
FIG. 3 is a diagram illustrating an exemplary configuration of the UI screen for registering a cloud printer according to the present embodiment.

FIG. 3 shows an exemplary configuration of a screen that is displayed when registering a cloud printer. In the present embodiments, each screen shown in FIG. 3 is provided by the cloud printing service 102. A screen 301 shows an exemplary configuration of the screen to be displayed when accessing the registration URL through a Web browser (not illustrated) or the like included in the client terminal 100. Specifically, the screen 301 is displayed when accessing the registration URL shown in the registration URL information 212 in the screen 211 shown in FIG. 2. User code information 302 is an input field for the user to input the user code. Specifically, the user code shown in the user code information 213 in the screen 211 shown in FIG. 2 is input. When the user inputs the user code in the user code information 302, and presses an OK button 303, the screen transitions to a screen 311.

The screen 311 shows an exemplary configuration of a screen in which user information of the user that registers the cloud printer is to be input. The user inputs the user name that has been registered to the cloud service in advance in the user information 312, and inputs a password to password information 313. Then, upon the login button 314 being pressed, the screen transitions to a screen 321.

The screen 321 shows an exemplary configuration of the screen to be displayed when logged in to the cloud service. A login name is displayed in login name information 323. A tenant name of the cloud service is displayed in tenant name information 324. As described above, in the cloud service, one or more users belong to a tenant, which indicates a management unit, and a resource and service are provided for each tenant. It is assumed that information indicating which of the tenants logged-in users respectively belong to is registered in the cloud printing service 102 in advance. Here, if an OK button 322 is pressed after a message 325 saying that the registration of the cloud printer has been completed is displayed, the screen transitions to a screen 331. After the registration of the cloud printer has been completed, the user can use the registered cloud printer. Here, the configuration may be such that a plurality of users that belong to the tenant with respect to which the cloud printer has been registered can use the cloud printer in a shared manner.

The screen 331 shows an exemplary configuration of the management screen of a cloud printer. The cloud printers that the user can use are displayed in a cloud printer list 332 in a list form. In this example, it is shown that two cloud printers denoted by "iR-Adv-CXXXX" and "Satera-MFYYYY" can be used. Also, the statuses of the cloud printers are shown as "idle", "processing", and the like. Note that the information regarding the cloud printer is not limited to the status information, and another information may be displayed.

First Embodiment

A mechanism for registering one printing apparatus in the cloud printing service 102 as a plurality of cloud printers will be described in further detail based on the configuration described above, as a first embodiment of the invention of the present application. It is assumed that, as a result of the printing apparatus 101 being registered in the cloud printing service 102 in association with a tenant, the printing apparatus 101 can operate as a cloud printer, as described above.

Hardware Configuration

Figure 4:
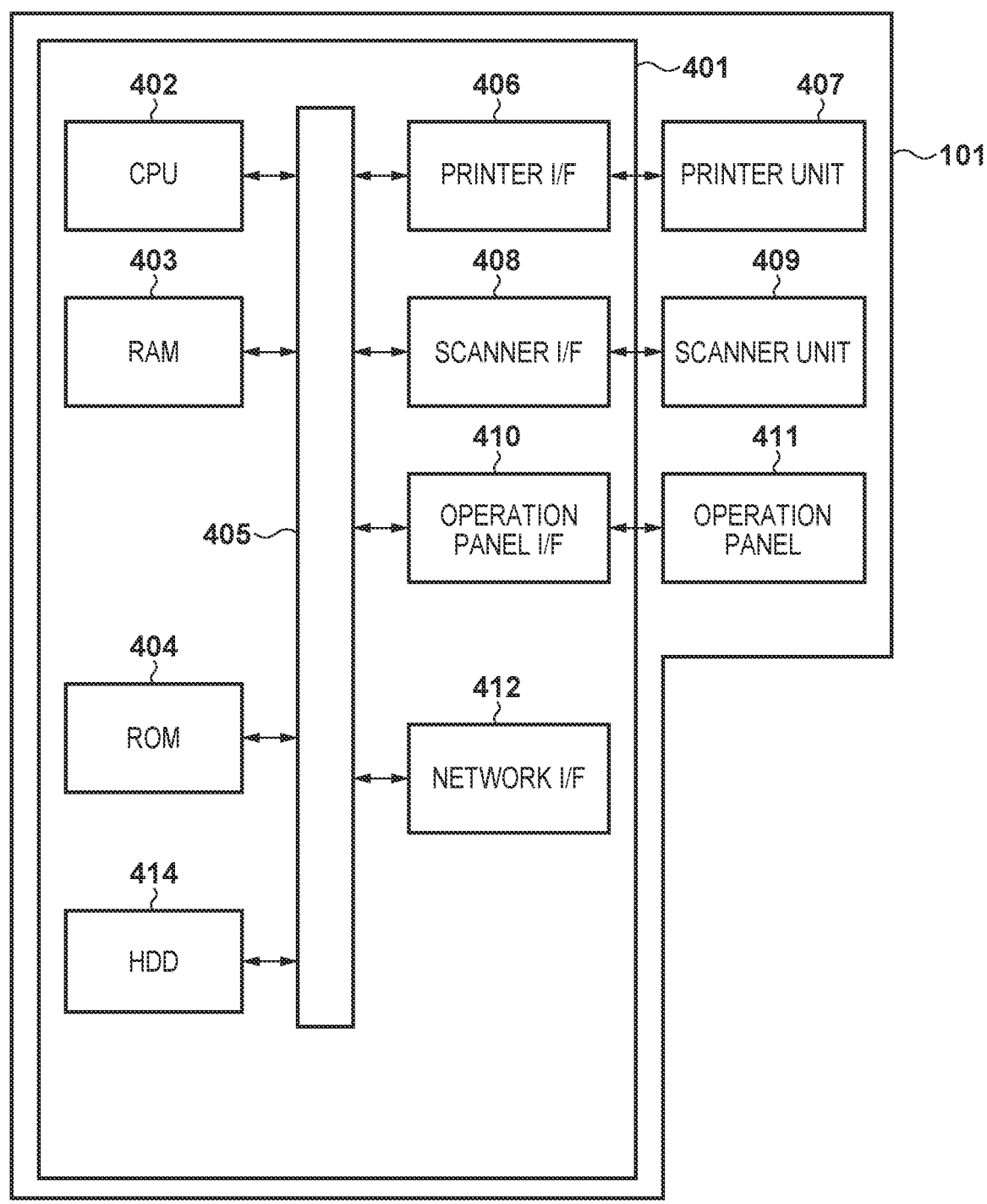
FIG. 4 is a diagram illustrating an exemplary hardware configuration of a printing apparatus according to the present embodiment.

FIG. 4 is a diagram illustrating an exemplary hardware configuration of the printing apparatus 101 according to the present embodiment. A control unit 401 including a CPU (Central Processing Unit) 402 controls the overall operations of the printing apparatus 101. The CPU 402 reads out a control program stored in a ROM (Read Only Memory) 404, and performs various types of control such as communication control. A RAM (Random Access Memory) 403 is used as a main memory of the CPU 402 and a temporary storage region such as a work area. An HDD (Hard Disk Drive) 414 stores data, various programs, and various information tables.

A printer I/F 406 is an interface for outputting an image signal to a printer unit 407 (printer engine). Also, a scanner I/F 408 is an interface for receiving a read image signal from a scanner unit 409 (scanner engine). The CPU 402 processes the image signal received from the scanner I/F 408, and when printing is performed, outputs the processed signal to the printer I/F 406 as a recording image signal.

An operation panel I/F 410 is an interface for connecting an operation panel 411 and the control unit 401. The operation panel 411 includes a liquid crystal display unit having a touch panel function, a keyboard, and the like. A network I/F 412 is an interface for transmitting information to external apparatuses such as the client terminal 100 and the cloud printing service 102, and receiving various types of information from the external apparatuses. The units of the control unit 401 are mutually communicably connected by a system bus 405.

Software Configuration

Figure 5:
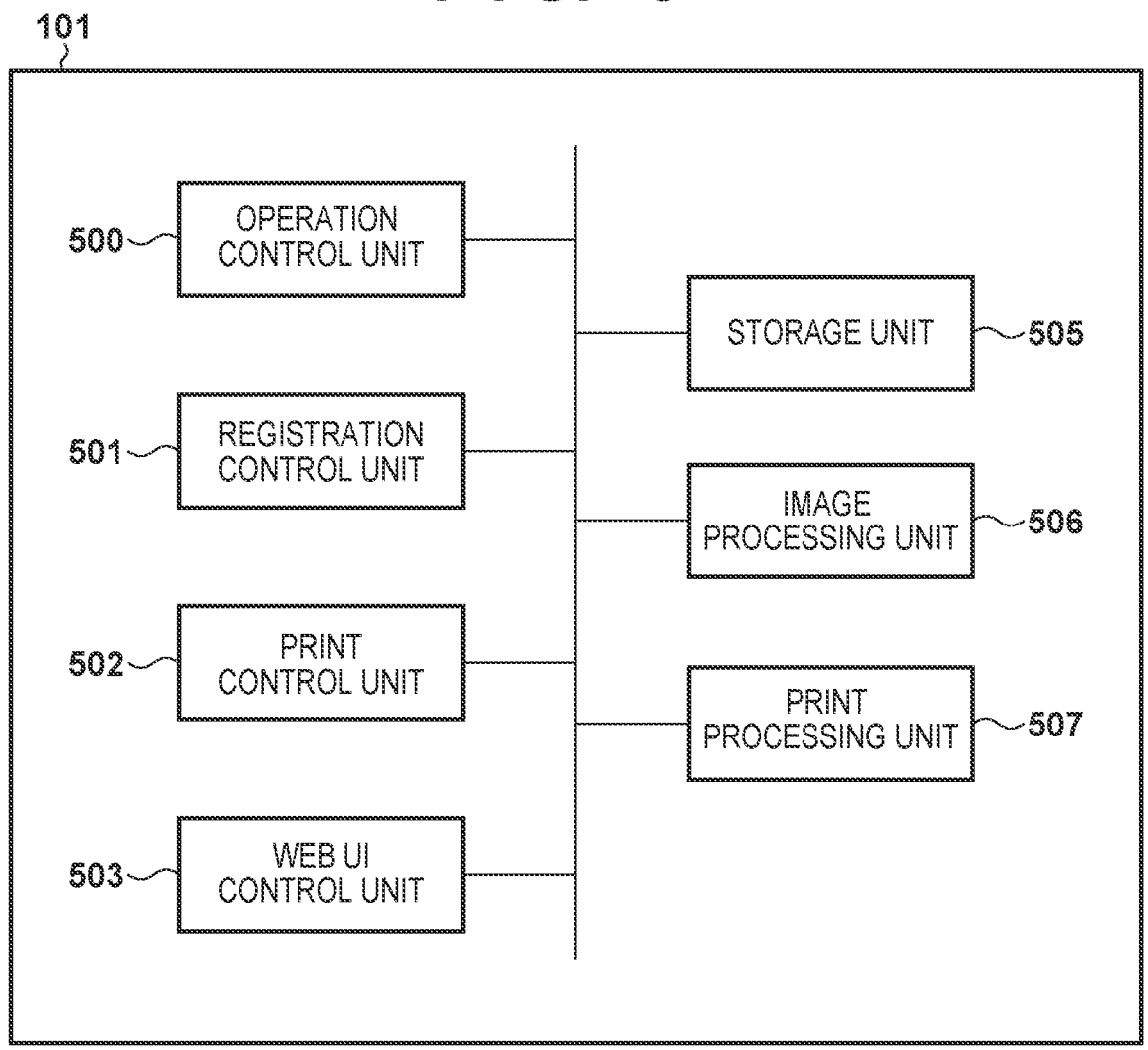
FIG. 5 is a diagram illustrating an exemplary software configuration of the printing apparatus according to the present embodiment.

FIG. 5 is a diagram illustrating an exemplary software configuration of the printing apparatus 101 according to the present embodiment. Each functional unit shown in FIG. 5 is realized by the CPU 402 included in the printing apparatus 101 executing a control program.

An operation control unit 500 controls the operation panel 411. Specifically, the operation control unit 500 waits for an instruction input from a user while displaying an operation menu in the operation panel 411, and notifies the other functional units of the received instruction contents. Also, the operation control unit 500 displays results of processing executed based on the instruction, on the operation panel 411. A registration control unit 501 analyzes a registration request received from the client terminal 100. Moreover, the registration control unit 501 transmits a registration request to the cloud printing service 102 based on the analysis results. With this, the processing for registering the cloud printer is controlled.

A print control unit 502 transfers the print data received from the cloud printing service 102 to an image processing unit 506 along with a print instruction. Note that the printing apparatus 101 according to the present embodiment may also be able to process normal printing processing in which the cloud printing service 102 is not used, but here a description will be given focusing on the operations in which the cloud printing is used, and the description of the normal printing processing will be omitted. A storage unit 505 stores designated various types of data in the ROM 404 and the HDD 414, and reads out stored data therefrom, based on instructions from the other functional units. Cloud printer information indicating that the printing apparatus 101 is registered as a cloud printer is an example of data managed by the storage unit 505. The cloud printer information includes a cloud device ID, for example.

An image processing unit 506 performs processing for rendering a print job to image data for printing based on various settings. A print processing unit 507 outputs image data obtained by rendering performed by the image processing unit 506 to the printer unit 407 via the printer I/F 406 as an image signal. The printer unit 407 performs print processing based on this image signal. A Web UI control unit 503 controls a Web UI that is used when the user performs a setting operation of devices from the client terminal 100 such as a PC.

Operation Panel

Figure 6:
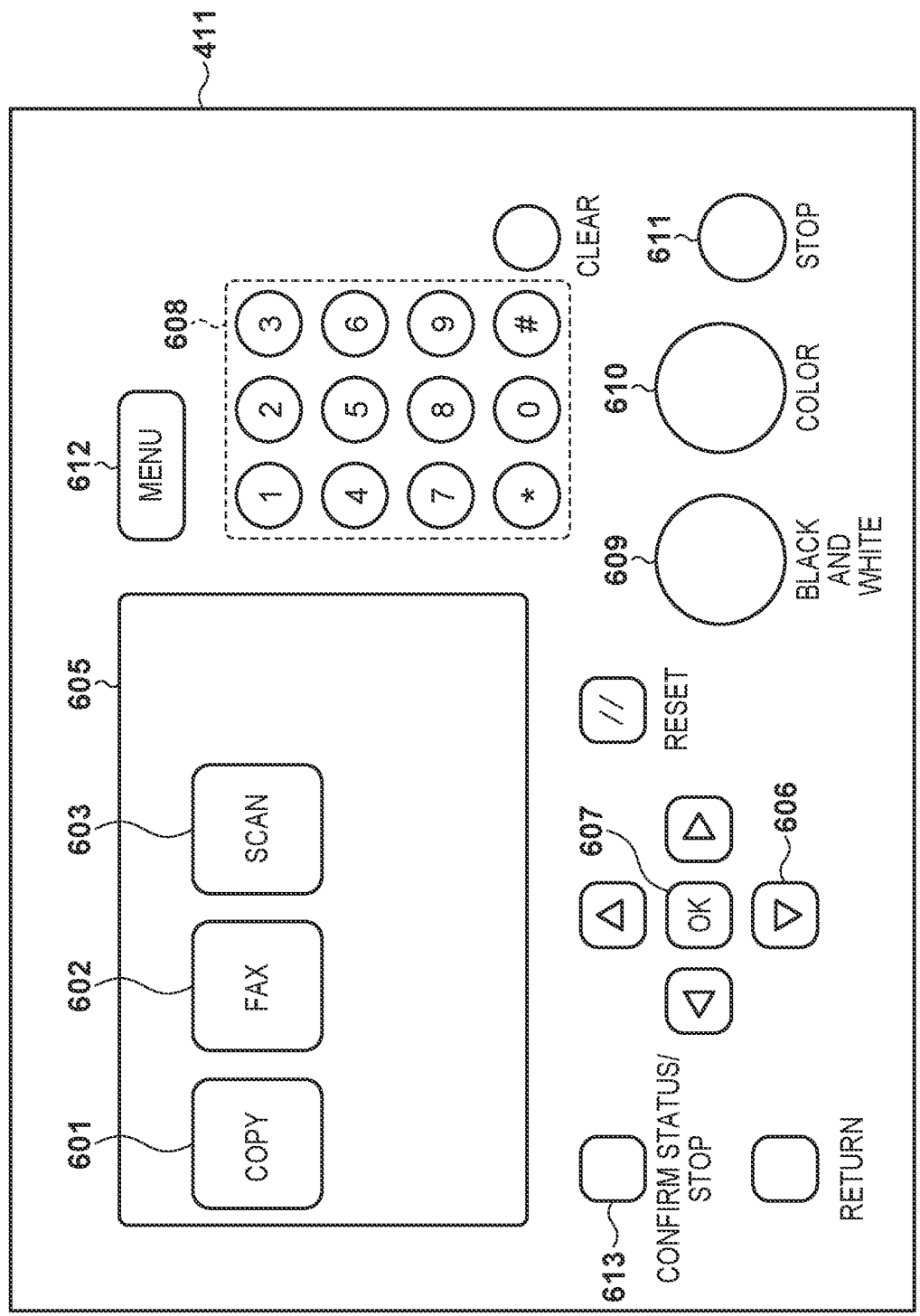
FIG. 6 is a diagram illustrating an exemplary configuration of an operation panel of the printing apparatus according to the present embodiment.

FIG. 6 is a diagram illustrating an exemplary configuration of the operation panel 411 of the printing apparatus 101 according to the present embodiment. In the present embodiment, the operation panel 411 is constituted by a display unit 605 that can provide soft keys, and other plurality of physical hard keys. The display unit 605 is a display unit that utilizes an LCD (Liquid Cristal Display) or the like, and can receive user operations by appropriately changing the display contents. Here, a state is shown in which three buttons 601 to 603 are selectably displayed in the display unit 605. The button 601 is a button that is pressed when a copy is made using the printing apparatus 101, and when this button is pressed, a copy operation screen (not illustrated) is displayed in the display unit 605. The button 602 is a button that is pressed when FAX is sent/received using the printing apparatus 101, and when this button is pressed, a FAX operation screen (not illustrated) is displayed in the display unit 605. The button 603 is a button that is pressed when scanning is performed using the printing apparatus 101, and when this button is pressed, a scan operation screen (not illustrated) is displayed in the display unit 605.

A ten key 608 is used to input a number and the like. An OK key 607 is used when determining the display contents in the display unit 605, and the like. A directional key 606 is used when selecting a menu displayed in the display unit 605, and the like. Buttons 609 and 610 are respectively used when black and white copying and color copying are executed. A button 611 is used to stop processing. A button 612 is used to display a menu screen (not illustrated) for performing setting of the printing apparatus 101 in the display unit 605. A button 613 is used to confirm the status of the printing apparatus 101, that is, to display a list of print jobs received by the printing apparatus 101, and the like.

Registration Processing

Figure 7:
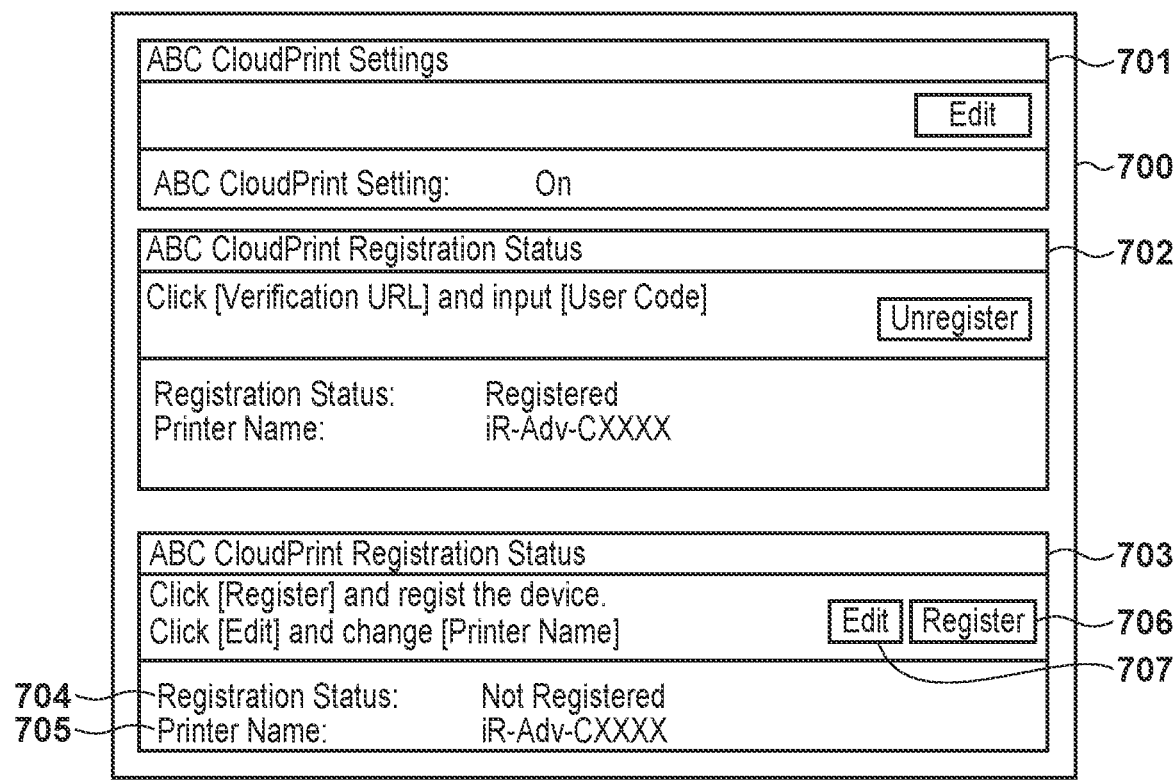
FIG. 7 is a diagram illustrating an exemplary configuration of the UI screen when registering a cloud printer according to a first embodiment.

A screen 700 in FIG. 7 is a setting screen of cloud printing of the printing apparatus 101 according to the present embodiment. A description will be given assuming that the screen shown in FIG. 7 is a Web UI similarly to FIG. 2. Note that the basic configurations are similar to those in FIG. 2, and the description will be given by focusing on the difference therefrom. An area 701 is an area for performing the setting of the cloud printing. An area 702 is an area showing a registration status of the cloud printing. In FIG. 2, when the registration has been completed, the screen 221 is displayed. As described above, changing the setting and deleting the registration of the cloud printer can be executed in the screen 221. Here, furthermore, an area 703 for performing cloud printer registration is displayed. The details of registration information 704, printer name information 705, a Register button 706, and an Edit button 707 that are to be displayed in the area 703 are respectively similar to those of the registration information 203, the printer name information 204, the Register button 206, and the Edit button 207 that are described with reference to FIG. 2.

According to the configuration illustrated in FIG. 7, the user can register the printing apparatus 101 with respect to which cloud printer registration has been completed as a cloud printer as another cloud printer.

Figure 8:
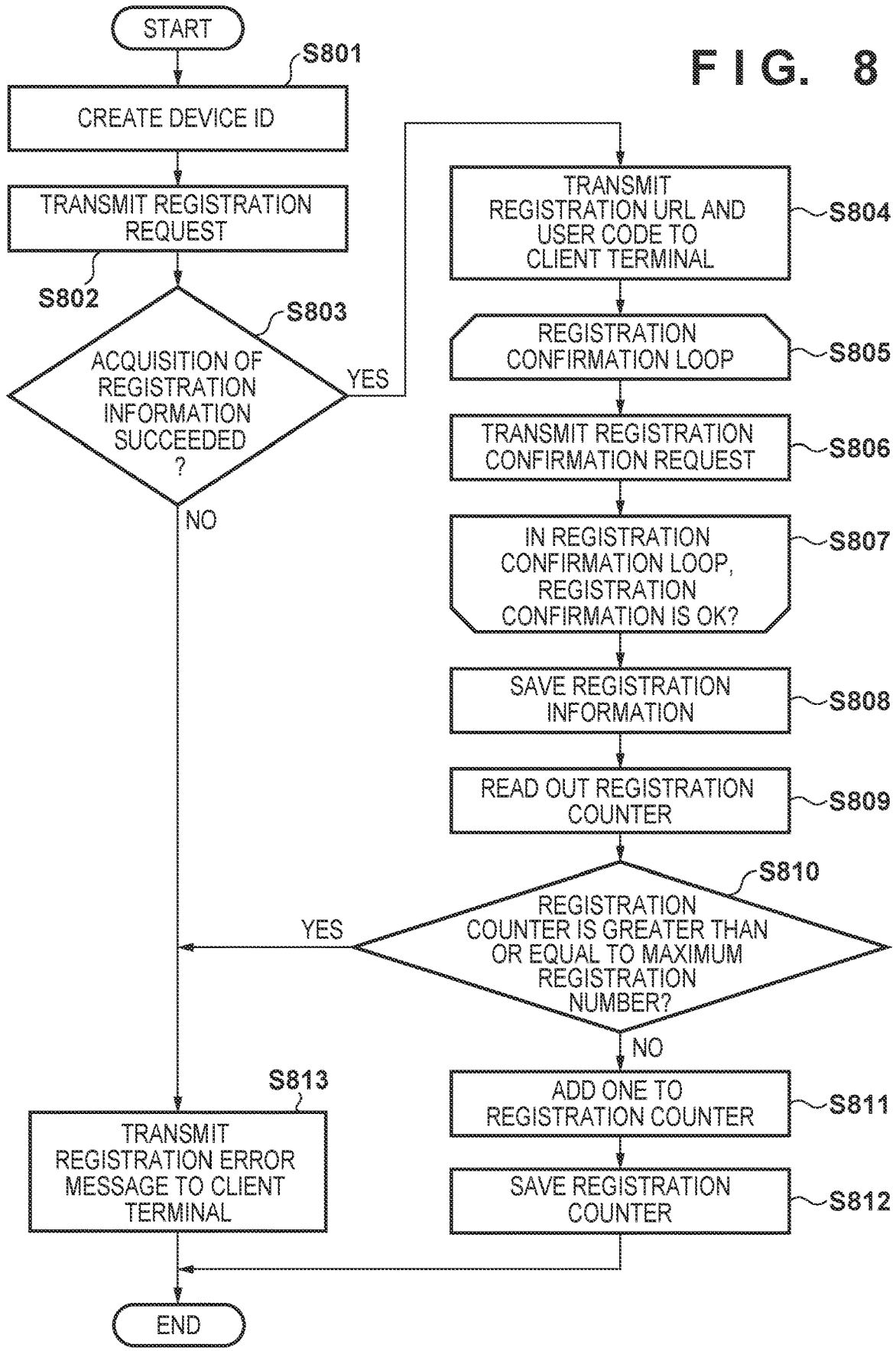
FIG. 8 is a flowchart of processing when registering the cloud printer according to the first embodiment.

FIG. 8 is a flowchart of processing that is to be performed when the user has made an instruction for registration in the printing apparatus 101 according to the present embodiment. It is assumed that, in the present embodiment, the user performs operations by accessing the printing apparatus 101 using a Web browser (not illustrated) of the client terminal 100, and displaying the Web UI such as shown in FIG. 7. The processing in FIG. 8 is realized by the CPU 402 of the printing apparatus 101 executing various programs.

In response to the user having pressed the Register button 706 in the screen 700 in FIG. 7, the client terminal 100 transmits a registration request of the cloud printer to the printing apparatus 101 (F111 in FIG. 1). Then, the Web UI control unit 503 of the printing apparatus 101 receives this request, and analyzes the contents thereof. If the analyzed result indicates the registration request of the cloud printer, the Web UI control unit 503 passes the control to the registration control unit 501, and the processing in FIG. 8 is started.

In step S801, the registration control unit 501 creates the device ID 130. The device ID 130, here, is created so as to be a unique ID (identification information) using UUID (Universally Unique Identifier) or the like. In the present embodiment, it is assumed that different identification information is generated and used every time the registration request is performed. Note that the creation method and the management method of the device ID are not specifically limited, and any methods may be used.

In step S802, the registration control unit 501 transmits the registration request to the cloud printing service 102. This processing corresponds to F111 in FIG. 1. Thereafter, as shown in F112 in FIG. 1, the cloud printing service 102 returns a response to the registration request.

In step S803, the registration control unit 501 analyzes the response to the registration request that has been transmitted from the cloud printing service 102, and determines whether or not the acquisition of the registration URL 131 and the user code 132 has been succeeded. For example, if the processing on the cloud printing service 102 side fails, a case is envisaged where the response does not include the registration URL 131 and the user code 132. Alternatively, a case is envisaged where the response cannot be received within a given period of time after transmitting the registration request due to communication failure or the like. If it is determined that the acquisition of the registration URL 131 and the user code 132 has not succeeded (NO in step S803), the processing is advanced to step S813, and if it is determined that the acquisition has succeeded (YES in step S803), the processing is advanced to step S804.

In step S804, the Web UI control unit 503 transmits the registration URL display screen information including the registration URL 131 and the user code 132 to the client terminal 100. This processing corresponds to the processing in F113 in FIG. 1.

In steps S805 to S807, the registration control unit 501 performs loop processing until the registration confirmation becomes OK. In step S805, the registration control unit 501 causes the processing to transition to the loop processing.

In step S806, the registration control unit 501 transmits a registration confirmation request to the cloud printing service 102. This processing corresponds to the processing in F116 in FIG. 1. If the cloud printing service 102 has already received the registration approval request from the client terminal 100 in advance (F114 in FIG. 1), the cloud printing service 102 makes a reply to the printing apparatus 101 with a registration confirmation response in which the cloud device ID 134 is set (F117 in FIG. 1).

In step S807, the registration control unit 501, upon receiving the registration confirmation response including the cloud device ID 134, determines that the registration confirmation is OK, causes the processing to exit the registration confirmation loop, and advance to step S808. If it is determined that the registration confirmation is not OK, the registration confirmation request is again transmitted to the cloud printing service 102 in the loop processing. Note that the registration confirmation request may be repeatedly transmitted at prescribed intervals until the registration confirmation becomes OK. Also, the configuration may also be such that if the registration confirmation is still not OK even if the loop processing has been repeated at a given number of times, the loop processing is ended, and error processing is performed.

In step S808, the registration control unit 501 saves the registration information such as the device ID 130 created in step S801 and the cloud device ID 134 received in step S807 to the storage unit 505 in an associated manner.

In step S809, the registration control unit 501 reads out a registration counter value from the storage unit 505. The registration counter value indicates the number of registrations of the printing apparatus 101 as the cloud printer, and "0" is set to the initial value, which indicates that the printing apparatus has not been registered as the cloud printer. It is assumed that an upper limit value (maximum registration number) is set to the printing apparatus 101. This value indicates the number that the printing apparatus 101 can be registered as the cloud printer. A fixed value may be set to the maximum registration number for each device, or the administrator of a printing apparatus may set any value to the maximum registration number.

In step S810, the registration control unit 501 determines whether the read-out registration counter value is greater than or equal to the maximum registration number. If the registration counter value is greater than or equal to the maximum registration number (YES in step S810), the processing is advanced to step S813, and if the registration counter value is less than the maximum registration number (NO in step S810), the processing is advanced to step S811.

In step S811, the registration control unit 501 adds one to the registration counter value.

In step S812, the registration control unit 501 saves the registration counter value to the storage unit 505, and ends this processing flow.

In step S813, the Web UI control unit 503 transmits an error message to the client terminal 100. There is no specific limitation on the content of the error message, but a message may be transmitted saying that the registration of the cloud printer has failed, for example. Then, this processing flow is ended.

Figure 9:
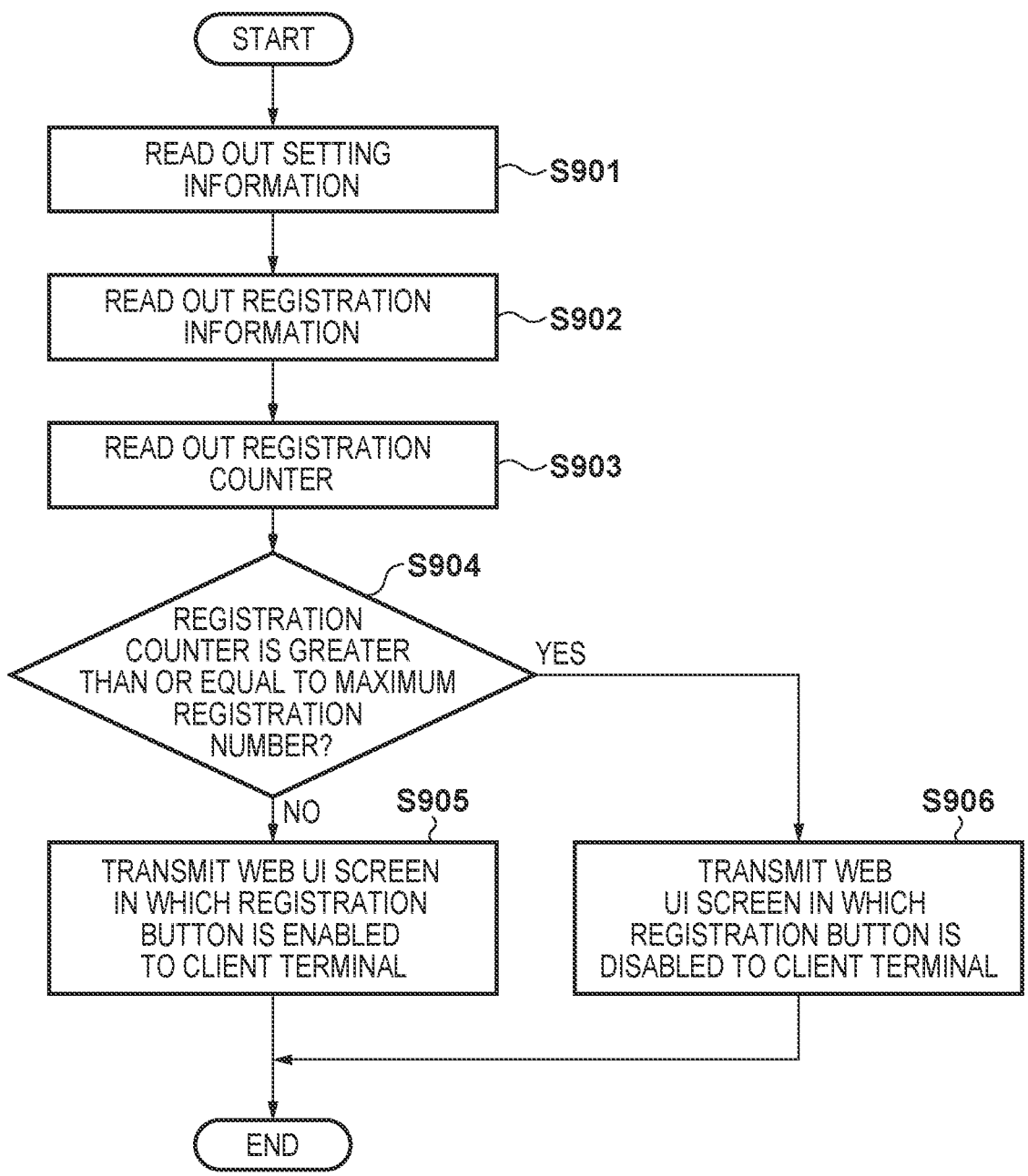
FIG. 9 is a flowchart of processing when displaying a setting screen of the cloud printer according to the first embodiment.

FIG. 9 shows a flowchart of processing to be performed when the printing apparatus 101 according to the present embodiment has accepted the request of a setting screen (Web UI) of the cloud printing. The setting screen here corresponds to the screen shown in FIG. 2 or 7, for example. In the present embodiment, this flow of processing is performed when a request of the setting screen from the client terminal 100 has been accepted before the processing shown in FIG. 8 is performed. The processing in FIG. 9 is realized by the CPU 402 of the printing apparatus 101 executing various programs.

In step S901, the Web UI control unit 503, upon receiving a request of the setting screen from the client terminal 100, reads out the setting information regarding the cloud printing from the storage unit 505. The setting information here corresponds to the setting information to be displayed in the screen shown in FIG. 2 or 7, for example.

In step S902, the Web UI control unit 503 reads out the registration information regarding the cloud printer from the storage unit 505. The registration information here corresponds to the information such as registration status and printer name that is displayed in the screen shown in FIG. 2 or 7, for example.

In step S903, the Web UI control unit 503 reads out the registration counter value from the storage unit 505.

In step S904, the Web UI control unit 503 determines whether or not the registration counter value that has been read out in step S903 is greater than or equal to the maximum registration number. If it is determined that the registration counter value is greater than or equal to the maximum registration number (YES in step S904), the processing is advanced to step S906, and if it is determined that the registration counter value is less than the maximum registration number (NO in step S904), the processing is advanced to step S905.

In step S905, the Web UI control unit 503 creates a Web UI screen including the setting information and the registration information that are read out from the storage unit 505, and transmits the Web UI screen to the client terminal. Here, information of the Web UI screen is transmitted such that an operation portion on the screen such as a registration button is displayed in an enabled state in order to make registration of a further cloud printer possible on the Web UI screen. Then, this processing flow is ended.

In step S906, the Web UI control unit 503 creates a Web UI screen including the setting information and the registration information that are read out from the storage unit 505, and transmits the Web UI screen to the client terminal. Here, information of the Web UI screen is transmitted such that the operation portion on the screen such as the registration button is displayed in a disabled state in order to make registration of a further cloud printer impossible on the Web UI screen. The configuration for disabling here may be a configuration in which the registration button itself is not displayed as a display item, or a configuration in which the registration button is displayed so as to be not operated (pressed). Then, this processing flow is ended.

As described above, according to the present embodiment, one printer can be registered as a plurality of different cloud printers that are managed on one cloud printing service. Accordingly, one printer can be shared and used between users that use different tenants in a cloud printing service in a multi-tenant environment.

Second Embodiment

In the first embodiment, a mechanism for registering one printing apparatus as a plurality of cloud printers in a cloud printing service has been described. A mechanism for notifying an upper limit of the number of registrations will be described as a second embodiment of the invention of the present application, in addition to the configuration of the first embodiment.

In the first embodiment, the printing apparatus 101 confirms the number of registrations when a request for the setting screen has been received (FIG. 9) and when registration confirmation has been performed (FIG. 8). In the second embodiment, when the registration button is pressed on the UI screen of the printing apparatus 101, it is confirmed whether or not the number of registrations of the cloud printers exceeds a maximum number of registrations, and if the number of registrations exceeds the maximum number of registrations, a limitation is imposed such that the registration is not permitted by displaying a predetermined error screen. Note that the hardware configuration and the software configuration in the second embodiment are similar to those in the first embodiment, and therefore the description thereof will be omitted.

Figure 10:
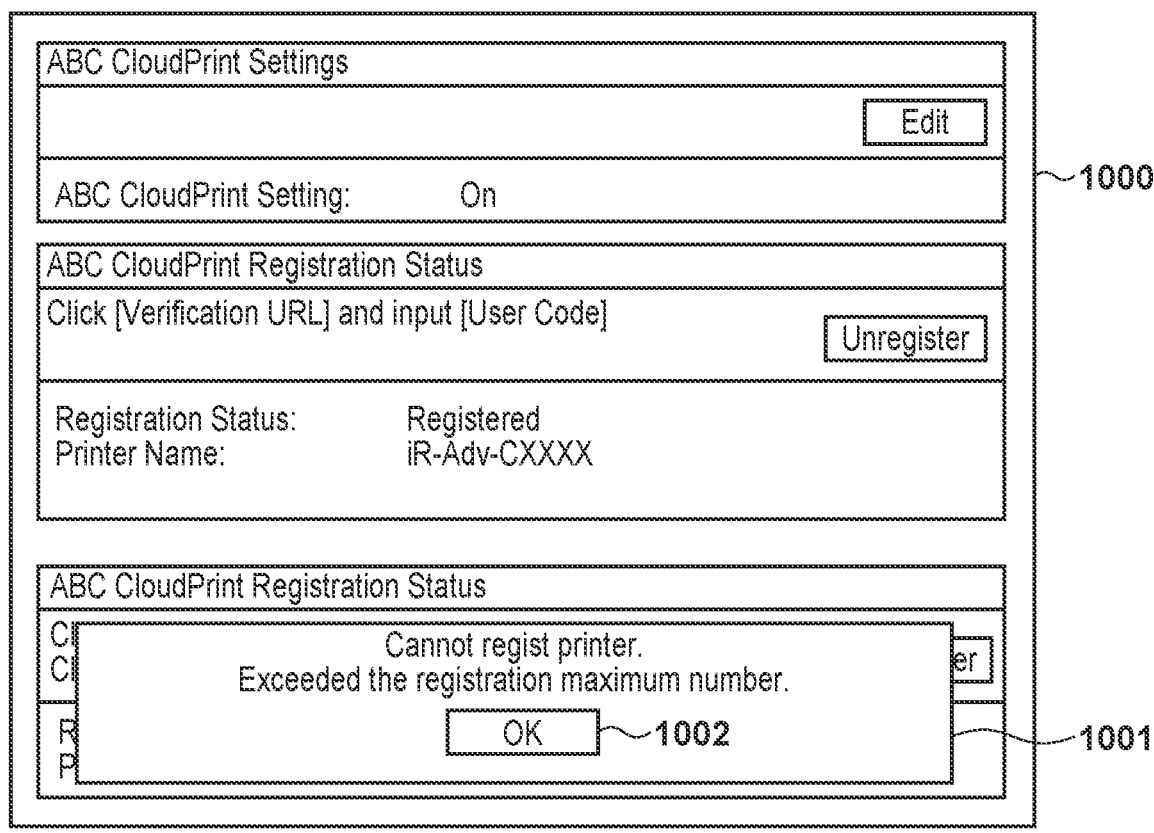
FIG. 10 is a diagram illustrating an exemplary configuration of a UI screen for restricting registration of a cloud printer according to a second embodiment.

FIG. 10 is a diagram illustrating an exemplary UI configuration when limiting the registration of cloud printers such that the number thereof will not exceed the maximum number of registrations, in the printing apparatus 101 according to the present embodiment. A screen 1000 is a setting screen of a cloud printer of the printing apparatus 101. The details of the screen 1000 are similar to those of the screen 700 in FIG. 7 described in the first embodiment. In the present embodiment, when the Register button 706 in FIG. 7 is pressed, if the number of registrations as cloud printers exceeds the maximum number of registrations, a registration error screen 1001 is displayed. In the registration error screen 1001, a message indicating that the number of registrations exceeds the maximum registration number is displayed as the reason of the registration error. A user can hide the registration error screen 1001 by pressing an OK button 1002.

Processing Flow

Figure 11:
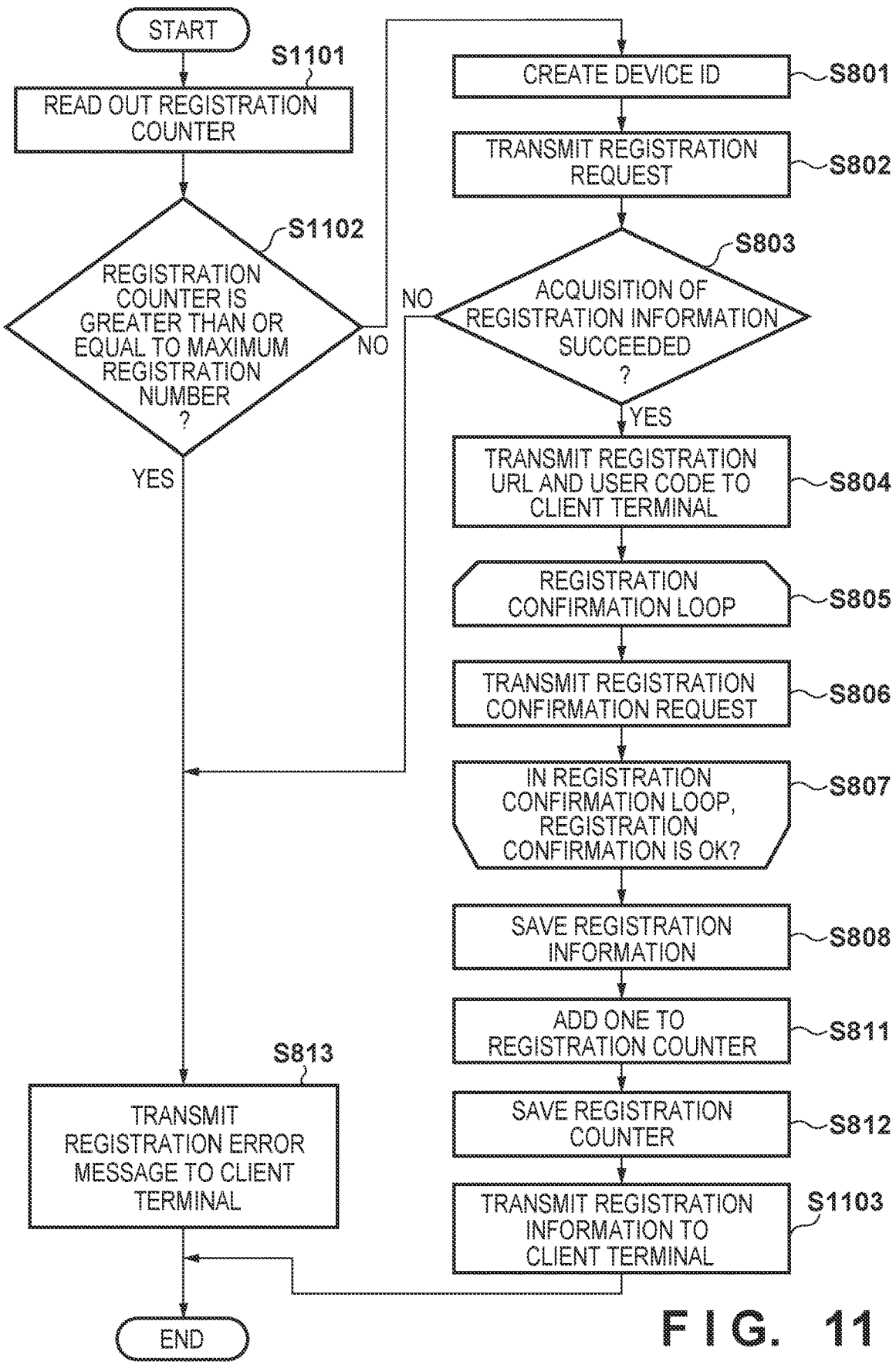
FIG. 11 is a flowchart of processing when registering the cloud printer according to the second embodiment.

FIG. 11 is a flowchart of processing that is performed when the user has pressed a registration instruction in the printing apparatus 101 according to the present embodiment. The processing in FIG. 11 is executed in place of the processing in FIG. 8 described in the first embodiment. Note that the processing steps that are the same as those in FIG. 8 are given the same reference numerals, and the description thereof will be omitted. It is assumed that, in the present embodiment, the user accesses the printing apparatus 101 using the Web browser of the client terminal 100, and makes operations through the Web UI as displayed in FIG. 10. The processing in FIG. 11 is realized by the CPU 402 of the printing apparatus 101 executing various programs.

In response to the pressing of the Register button 706 by the user in the screen 700 in FIG. 7, the client terminal 100 transmits a registration request of the cloud printer to the printing apparatus 101 (F111 in FIG. 1). Then, the Web UI control unit 503 of the printing apparatus 101 receives this request and analyzes the contents. If, as a result of the analysis, the request is a registration request of the cloud printer, passes the control to the registration control unit 501, and the processing in FIG. 11 is started.

In step S1101, the registration control unit 501 reads out the registration counter value from the storage unit 505.

In step S1102, the registration control unit 501 determines whether or not the registration counter value read out in step S1101 is greater than or equal to a maximum registration number. If it is determined that the registration counter value is greater than or equal to the maximum registration number (YES in step S1102), the processing is advanced to step S813, and an error message is transmitted in step S813. With this, the registration error screen 1001 in FIG. 10 is displayed on the client terminal 100 side. On the other hand, if it is determined that the registration counter value is less than the maximum registration number (NO in step S1102), the processing is advanced to step S801.

In the present embodiment, after the processing for saving the registration information in step S808, addition processing of registration counter in step S811 is performed. Moreover, after the processing for saving the registration counter value is performed in step S812, in step S1103, the Web UI control unit 503 transmits registration information to the client terminal 100. The registration information to be transmitted here corresponds to information such as the registration status and the printer name that are displayed in the screen shown in FIG. 10, for example. Then, this processing flow is ended.

As described above, according to the present embodiment, when an attempt is made to register a printer in the cloud printing service as a plurality of cloud printers, a notification can be made as to whether or not the registration is possible based on the upper limit of registrations. Therefore, when a request is made for a new registration which would cause the upper limit value to be exceeded, the user can be notified of this fact while imposing limitation.

Third Embodiment

As a third embodiment of the invention of the present application, a mechanism for displaying tenant information in a setting registration screen in addition to the processing in first embodiment will be described. Note that the hardware configuration and the software configuration according to the third embodiment are similar to those in the first embodiment, and therefore the description thereof will be omitted.

FIG. 12 is a diagram illustrating an exemplary UI configuration of the printing apparatus 101 according to the present embodiment. A screen 1200 is a setting screen of cloud printing of the printing apparatus 101. The details of the screen 1200 are similar to those of the screen 700 in FIG. 7 described in the first embodiment. FIG. 12 shows a state in which the printing apparatus 101 is registered as two cloud printers. The pieces of information of the registered cloud printers are respectively displayed in areas 1202 and 1203. In the present embodiment, the cloud printer information includes tenant information.

In the area 1202, information "XXX-oip" of the registered tenant is displayed as tenant information 1205 in addition to the information of the registration status and the printer name. Also, in the area 1203, information "YYY-ij" of the registered tenant is displayed as tenant information 1206 in addition to the information of the registration status and the printer name.

Figure 13:
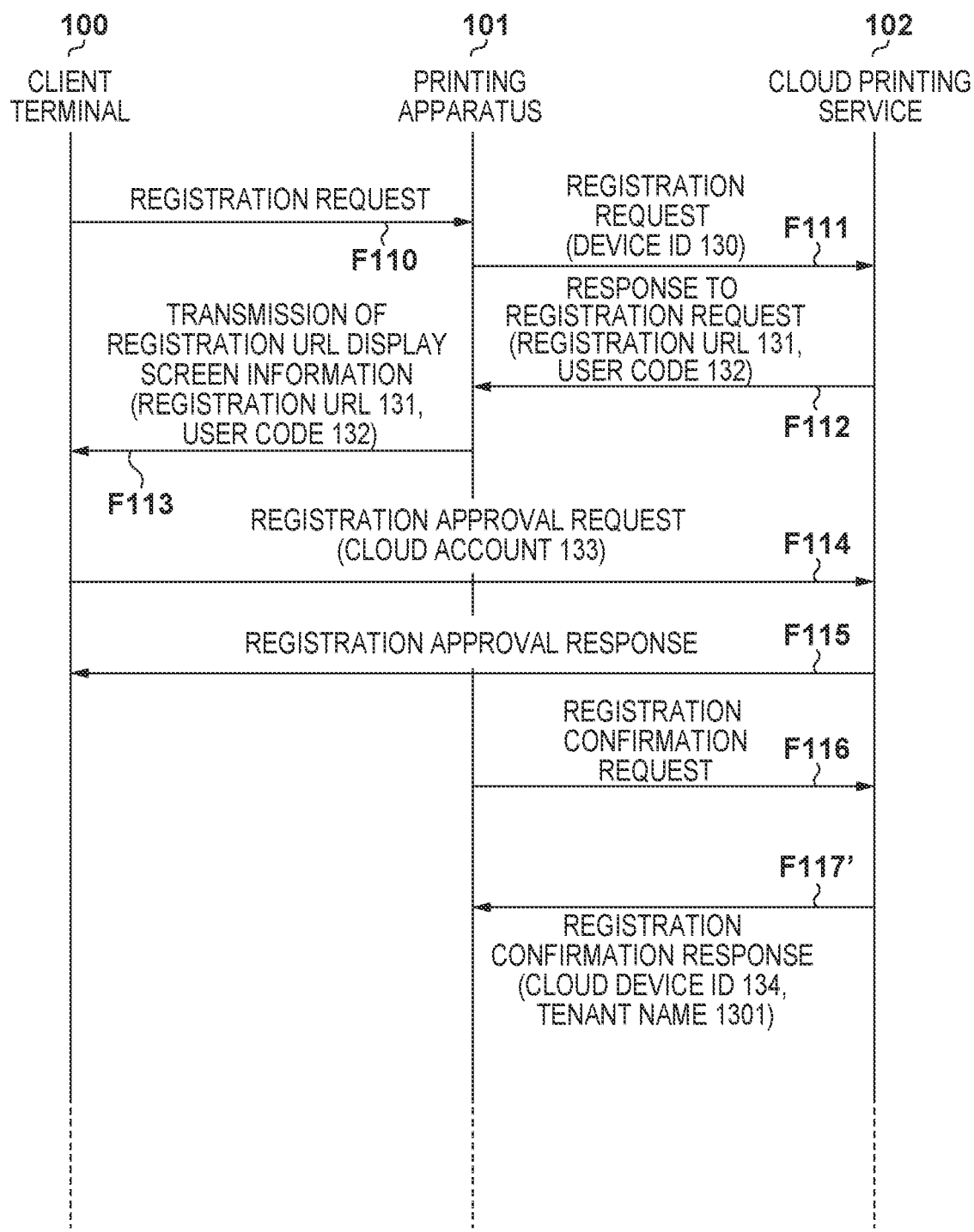
FIG. 13 is a diagram illustrating a processing sequence of cloud printing according to the third embodiment.

FIG. 13 is a diagram illustrating an example of the processing sequence of the cloud printing according to the present embodiment. The details of the sequence is almost the same as the sequence described using FIG. 1, and therefore the differences therefrom will be described. Specifically, the processing in F117' is different. In F116, the cloud printing service 102, upon receiving a registration confirmation request from the printing apparatus 101, transmits a registration confirmation response in which information regarding the name of the tenant 1301 to which the cloud account 133 received in F114 belongs (associated with) is included in addition to the cloud device ID 134 to the printing apparatus 101.

The printing apparatus 101, upon receiving the registration confirmation response from the cloud printing service 102, analyzes the contents thereof, and displays the contents in which tenant name information is included on the screen, as shown in FIG. 12.

As described above, according to the present embodiment, the tenant information is also displayed in the registered cloud printer information in the setting registration screen of the printing apparatus 101. With this, the user can grasp the tenant to which the printing apparatus is registered. As a result, a printing apparatus can be prevented from being registered, in a duplicated manner, to the same tenant as a cloud printer.

Other Embodiments

In the embodiments described above, a configuration is adopted in which a printer name can be set when registering a printing apparatus as the cloud printer. In this case, the configuration may be such that the same name can be registered for each tenant, or different names can be set.

Also, if the printer name designated when registering a printing apparatus to a tenant as the cloud printer is the same as the printer name of a different printing apparatus that has already been registered to the tenant as the cloud printer, a display for confirming this fact may be performed. In this case, a display for prompting the user to change the designated printer name may be performed. Also, in such a situation, information regarding the different printing apparatus to which the same printer name is set may be displayed, or information regarding the user who has registered the different printing apparatus as the cloud printer may be displayed.

Also, when the user registers one printing apparatus to a tenant as a cloud printer, if the printing apparatus has already been registered to the tenant, a display for confirming this fact may be performed. After this confirmation, it may be confirmed whether or not the printing apparatus is to be registered to the same tenant as a different cloud printer.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-096253, filed May 22, 2019 which is hereby incorporated by reference herein in its entirety.

What is claimed is:

1. A printing apparatus that can be used in a first type cloud printing service, comprising:
   at least one processor; and
   at least one memory storing at least one program,
   wherein the at least one program is executed by the at least one processor to:
   provide information of a printer registration screen to receive an operation for registering the printing apparatus to a tenant, wherein the printer registration screen receives an operation for registering the printing apparatus to each of a plurality of tenants;
   receive an instruction for registering the printing apparatus in response to an operation for registering the printing apparatus to the tenant via the printing registration screen, in association with a tenant that is managed in the first type cloud printing service, as a cloud printer that is used by a user belonging to the tenant; and
   request, to the first type cloud printing service, to register the printing apparatus in association with the tenant based on a received instruction
   wherein even if the printing apparatus has already been registered as a cloud printer that is managed in the first type cloud printing service, an instruction for registering the printing apparatus as a different cloud printer that is managed in the first type cloud printing service is received, and
   wherein the printer registration screen receives a change of a name of the printer registered as the cloud printer for each tenant,
   different names can be assigned to the cloud printer for different tenants, and
   a registration status of a printer registered in each tenant and a printer name registered as a cloud printer are displayed for each tenant on the printer registration screen, and the printer registration screen includes an area for receiving a registration instruction to register the printing apparatus to the first type cloud printing service as a new cloud printer.

2. The printing apparatus according to claim 1, wherein the printing apparatus is configured to be registered as different cloud printers that are managed by the first type cloud printing service in association with different tenants that are managed by the first type cloud printing service.

3. The printing apparatus according to claim 1, wherein the at least one program is executed to:
   manage the number of registrations of the printing apparatus being registered as cloud printers;
   determine whether or not the number of registrations managed exceeds an upper limit value indicating the maximum number of registrations of being able to be registered as cloud printers; and
   if it is determined that the number of registrations exceeds the upper limit value, perform control such that the printing apparatus is not newly registered as a cloud printer of the first type cloud printing service.

4. The printing apparatus according to claim 3, wherein if it is determined that the number of registrations exceeds the upper limit value, the printing apparatus is not newly registered as a cloud printer of the first type cloud printing service by controlling display so as to not display a display item for inducing the instruction.

5. The printing apparatus according to claim 3, wherein, if it is determined that the upper limit value is exceeded when receiving a selection of a display item for inducing the instruction, a predetermined error is displayed without requesting the registration.

6. The printing apparatus according to claim 1, wherein the at least one program is executed to, when the printing apparatus is registered as one or more cloud printers, display registration information regarding the registration.

7. The printing apparatus according to claim 6, wherein information regarding a tenant is displayed with respect to which the printing apparatus is registered as a cloud printer, as the registration information.

8. The printing apparatus according to claim 1, wherein if the printing apparatus has already been registered as a cloud printer of the first type cloud printing service when the instruction has been received from a user, the user is asked whether or not the printing apparatus is to be registered as a different cloud printer.

9. The printing apparatus according to claim 1, wherein every time the request is made, identification information indicating the printing apparatus that is to be included in the request is changed.

10. A printing system comprising:
    a printing apparatus that can be used in a first type cloud printing service; and
    a server that provides the first type cloud printing service,
    wherein the printing apparatus includes:
    at least one processor; and
    at least one memory storing at least one program, and
    wherein the at least one program is executed by the at least one processor to:
    provide information of a printer registration screen to receive an operation for registering the printing apparatus to a tenant, wherein the printer registration screen receives an operation for registering the printing apparatus to each of a plurality of tenants;
    receive an instruction for registering the printing apparatus in response to an operation for registering the printing apparatus to the tenant via the printing registration screen, in association with a tenant that is managed in the first type cloud printing service, as a cloud printer that is used by a user belonging to the tenant; and
    request, to the first type cloud printing service, to register the printing apparatus in association with the tenant based on a received instruction wherein even if the printing apparatus has already been registered as a cloud printer that is managed in the first type cloud printing service, an instruction can be received for registering the printing apparatus as a different cloud printer that is managed in the first type cloud printing service, and wherein the printer registration screen receives a change of a name of the printer registered as the cloud printer for each tenant, different names can be assigned to the cloud printer for different tenants, and a registration status of a printer registered in each tenant and a printer name registered as a cloud printer are displayed for each tenant on the printer registration screen, and the printer registration screen includes an area for receiving a registration instruction to register the printing apparatus to the first type cloud printing service as a new cloud printer.

11. A method of registering a printing apparatus that can be used in a first type cloud printing service, comprising:

providing information of a printer registration screen to receive an operation for registering the printing apparatus to a tenant, wherein the printer registration screen receives an operation for registering the printing apparatus to each of a plurality of tenants;

receiving an instruction for registering the printing apparatus in response to an operation for registering the printing apparatus to the tenant via the printing registration screen, in association with a tenant that is managed in the first type cloud printing service, as a cloud printer that is used by a user belonging to the tenant; and requesting, to the first type cloud printing service, to register the printing apparatus in association with the tenant based on a received instruction, wherein, in the receiving of an instruction, even if the printing apparatus has already been registered as a cloud printer that is managed in the first type cloud printing service, an instruction can be received for registering the printing apparatus as a different cloud printer that is managed in the first type cloud printing service, and wherein the printer registration screen receives a change of a name of the printer registered as the cloud printer for each tenant, different names can be assigned to the cloud printer for different tenants, and a registration status of a printer registered in each tenant and a printer name registered as a cloud printer are displayed for each tenant on the printer registration screen, and the printer registration screen includes an area for receiving a registration instruction to register the printing apparatus to the first type cloud printing service as a new cloud printer.

12. A non-transitory computer-readable storage medium storing a program that, when executed by a computer that controls a printing apparatus that can be used in a first type cloud printing service, causes the computer to execute:

providing information of a printer registration screen to receive an operation for registering the printing apparatus to a tenant, wherein the printer registration screen receives an operation for registering the printing apparatus to each of a plurality of tenants;

receiving an instruction for registering the printing apparatus in response to an operation for registering the printing apparatus to the tenant via the printing registration screen, in association with a tenant that is managed in the first type cloud printing service, as a cloud printer that is used by a user belonging to the tenant; and requesting, to the first type cloud printing service, to register the printing apparatus in association with the tenant based on a received instruction, wherein, in the instructing, even if the printing apparatus has already been registered as a cloud printer that is managed in the first type cloud printing service, an instruction can be received for registering the printing apparatus as a different cloud printer that is managed in the first type cloud printing service, and wherein the printer registration screen receives a change of a name of the printer registered as the cloud printer for each tenant, different names can be assigned to the cloud printer for different tenants, and a registration status of a printer registered in each tenant and a printer name registered as a cloud printer are displayed for each tenant on the printer registration screen, and the printer registration screen includes an area for receiving a registration instruction to register the printing apparatus to the first type cloud printing service as a new cloud printer.

* * * * *